United States Patent
Potter et al.

(10) Patent No.: US 7,529,730 B2
(45) Date of Patent: May 5, 2009

(54) METHOD AND SYSTEM FOR DATABASE JOIN DISAMBIGUATION

(75) Inventors: Charles Mike Potter, Osgoode (CA); Glen Michael Seeds, Ottawa (CA); Henk Cazemier, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 336 days.

(21) Appl. No.: 10/366,261

(22) Filed: Feb. 12, 2003

(65) Prior Publication Data

US 2003/0217048 A1    Nov. 20, 2003

(30) Foreign Application Priority Data

Feb. 12, 2002    (CA)    ................... 2371731

(51) Int. Cl.
G06F 7/00     (2006.01)
G06F 17/30    (2006.01)

(52) U.S. Cl. ................ 707/3; 707/2; 707/10; 707/100

(58) Field of Classification Search ............ 707/3, 707/2, 4, 5, 6, 10, 100, 101
See application file for complete search history.

(56) References Cited

U.S. PATENT DOCUMENTS

| | | | | |
|---|---|---|---|---|
| 5,197,005 A | * | 3/1993 | Shwartz et al. ............. | 707/2 |
| 5,297,280 A | * | 3/1994 | Potts et al. ............... | 707/5 |
| 5,454,106 A | * | 9/1995 | Burns et al. .............. | 707/4 |
| 5,555,403 A | | 9/1996 | Cambot et al. | |
| 6,247,008 B1 | | 6/2001 | Cambot et al. | |
| 6,256,630 B1 | * | 7/2001 | Gilai et al. .............. | 707/6 |
| 6,374,257 B1 | * | 4/2002 | Guay et al. .......... | 707/103 R |
| 6,609,123 B1 | * | 8/2003 | Cazemier et al. ......... | 707/4 |
| 6,640,221 B1 | * | 10/2003 | Levine et al. ............ | 707/3 |
| 6,795,825 B2 | * | 9/2004 | Rishe .................... | 707/10 |
| 6,847,972 B1 | * | 1/2005 | Vernau et al. ........... | 707/101 |
| 7,185,016 B1 | * | 2/2007 | Rasmussen .............. | 707/100 |
| 2003/0217052 A1 | * | 11/2003 | Rubenczyk et al. ........ | 707/3 |
| 2004/0205740 A1 | * | 10/2004 | Lavery et al. ........... | 717/151 |
| 2004/0261021 A1 | * | 12/2004 | Mittal et al. ............ | 715/517 |

* cited by examiner

*Primary Examiner*—Hosain T Alam
*Assistant Examiner*—Usmaan Saeed
(74) *Attorney, Agent, or Firm*—Shumaker & Sieffert, P.A.

(57) ABSTRACT

In cases where two or more database tables can be joined by more than one relationship or criterion on the row values of selected columns, to produce what is effectively a wider table, there may result an ambiguity of which join should be used. The invention provides a means of join disambiguation that is rule-driven. The user is relieved of understanding the details of how the disambiguation is being done. The system described in this invention makes the choice of which join to use based on clear transformation rules which relate to folders of the tables and their relationships.

7 Claims, 5 Drawing Sheets

METHOD AND SYSTEM FOR DATABASE JOIN DISAMBIGUATION

BACKGROUND OF THE INVENTION

This invention is in the field of information processing, and more particularly in the field of modelling and database query generation and the disambiguation of joins.

Currently, information systems use predefined query techniques to hide the complexity of Structured Query Language (SQL) and relational databases. This allows users to specify parameters in order to add some conditions. Typically, members of Management Information System (MIS) staff build a database solution by creating user-dedicated tables, relational views or predefined SQL queries which are then made available to users by means of menus or similar techniques. In these systems, if end-users want to change the purpose of a query they ask the MIS staff to program another query. Alternatively the user may program the SQL query or command themselves. However, the syntax of non-procedural structured query language (in particular SQL) is complex, and typically, the data structure is not expressed in terms of the users' everyday work. Relational databases store information as well as metadata (data describing the data organisation) such as tables, columns, keys, indices, and their structure and design. Although suited to the overall needs of the customer organisation, these databases will likely contain much that is not of interest to a particular user. In addition, although a query may be syntactically correct, its results may not be what is expected, due to the inherent complexity of a large scale database. Indeed, the results may be totally meaningless.

For these and other reasons modeling tools are often used that allow conceptual modeling of databases in a graphical form. These tools provide a layer on top of the database, and allow the underlying database to be accessed in terms that are more relevant to a particular end application. Such modeling tools include "Impromptu", "Transformer", and "Architect" by Cognos Incorporated. Within such systems the join operation is used to synthesize a 'virtual' table from more than one real table. It is common in the design of databases, and in the queries that run against them, for there to be more than one way to join tables—this is known as join ambiguity. Because the results of a query depend on the join selected, any query must have a way to choose which of the available joins is to be used—a process often called join disambiguation.

An example of a simple join ambiguity is shown in FIG. 1. Two tables Table A 100, Table B 110 each comprising two fields, A1 101, A2 102 and B1 111, B2 112 respectively, and they are associated by two relationships or joins, Join 1 120, and Join 2 121. If a query identifies A1 101 and B1 111 then the ambiguity is that it is unclear whether Join 1 120 or Join 2 121 is the appropriate one to use.

One way of removing the join ambiguity is to require the user to specify the join explicitly. Another is to present the possibilities to the user, and require that one possibility be chosen before the query can be run. Both of these approaches create problems, because they require the user to be exposed to, and understand the detail of, data that are typically not directly related to the question that the user wants the database to answer.

Typical examples of a solution requiring the user to select from a number of options are illustrated in U.S. Pat. No. 6,247,008 "Relational database access system using semantically dynamic objects", Cambot, et al. and U.S. Pat. No. 5,555,403 "Relational database access system using semantically dynamic objects" Cambot, et al. in which the user may choose from a list of computed contexts. In case of join ambiguity, the automatic generation of joins by these inventions is such that it generates all the elements of an SQL statement automatically, which defines all the joins and the temporary tables needed to create a correct statement. These inventions then compute a set of contexts (a consistent set of joins) or propose a suitable set of contexts to the user. A context would be given a name that is somewhat meaningful to the user. Although this approach allows users to work with their own familiar business words and terminology and to access relational databases without being required to possess any knowledge of the structure of the database or the specific names of its physical elements, it does so at the cost of having to present the user with alternatives from which to choose in order to resolve join ambiguities. Furthermore, making this choice in itself often requires a level of detailed knowledge that may not be directly relevant to the user's immediate problem.

What is needed is a way to choose between ambiguous joins that more completely transfers the burden of making this choice from the user to the specialist who creates the application.

BRIEF SUMMARY OF THE INVENTION

The present invention provides a form of join disambiguation that is rule-driven. Since the specific parameters for the rules are provided by the modeller and encapsulated as a subject area, and because the subject area is chosen by the report author, the user is relieved of understanding the details of how the join disambiguation is being done. A subject area is defined by that collection of related tables, which together with their relationships, comprise a useful source of information suitable for querying by the user. In general, a subject area comprises one or more tables, known as query subjects, each comprising one or more columns, known as query items.

In one aspect the invention provides a method for accessing values in a database and creating a report comprising the steps of accepting from a user an indication of the elements required in a report, creating a set of one or more database queries required to produce the report disambiguating each database query in the set automatically by creating a model of the necessary query subjects, with their related query items and relationships thereby defining a set of transformation rules for the database that permits automatic disambiguation applying the set of disambiguated database queries to the database using the transformation rules, and creating the report based on the results of the set of database queries.

In a further aspect the invention provides a system for accessing values in a database and creating a report comprising means for accepting from a user an indication of the elements required in a report, means for creating a set of one or more database queries required to produce the report, means for disambiguating each database query in the set automatically by creating a model of the necessary query subjects, with their related query items and relationships, and defining a set of transformation rules for the database thereby permitting automatic disambiguation, means for applying the set of disambiguated database queries to the database using the transformation rules; and means for creating the report based on the results of the set of database queries.

Other aspects, features, and advantages of the present invention will become apparent from the following detailed description when taken in conjunction with the accompanying drawings.

BRIEF DESCRIPTION OF DRAWINGS

Embodiments of the invention will be described with reference to the following figures.

DETAILED DESCRIPTION OF THE INVENTION

We now describe preferred embodiments of the present invention. All such embodiments may conveniently be implemented on any general purpose computing platform, including one incorporated in a client/server or networked environment.

For purposes of these descriptions, we assume that the data being queried is in tabular form, as in conventional relational databases. Generally such "tables" may be thought of as consisting of "rows" and "columns". Two or more such tables can be joined by criteria on the row values of selected columns, to produce what is effectively a wider table. Note that the present invention is not limited to relational databases, but may be applied to any system that embraces these concepts.

Figure 1:
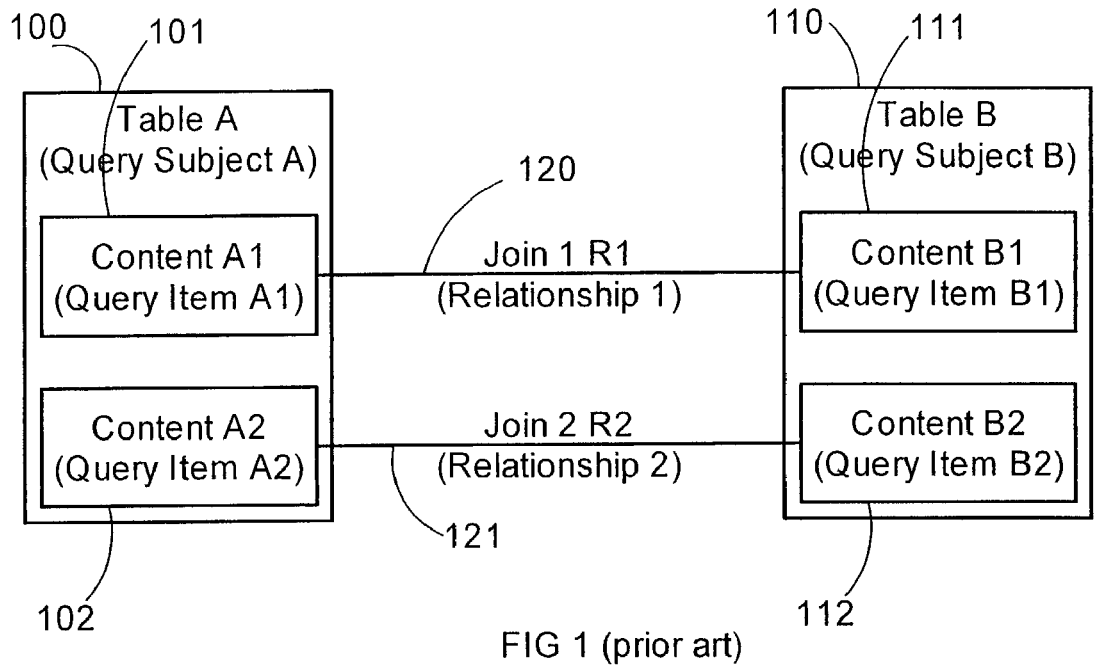
FIG. 1 shows a typical situation where there is potential for ambiguity in which an embodiment of the present invention may be practised.

In this discussion, a query subject QS represents a "table", a query item QI represents a "column", and a relationship R represents a "join". A relationship path is a set of one or more relationships that connects two query subjects, possibly via one or more intermediate query subjects. This is clearly illustrated in FIG. 2 that shows a model with an intermediate table. This case is analogous to the simple schema shown in FIG. 1 and described in the background section, but with the addition of the third query subject and related relationships. The same numbers are used in the figures to denote the same (or equivalent) entities. As before, there are two tables or query subjects Table A 100, and Table B 110, each comprising two fields, or query items, A1 101, A2 102 and B1 111, B1 112, respectively. Again, the tables are associated, but in this case only one relationship is direct, Join 2 121. The other relationship is achieved through a further third query subject Table C 230, comprising a single field or query item C1 231. Query subject Table A 100 and query subject Table C 230 are associated or related through Join 3 221 between A1 101 in Table A 100 and C1 231 in Table C 230. Similarly, query subjects Table B 110 and Table C 230 are associated or related through Join 4 222 between C1 231 in query subject Table C 230 and B1 111 in query subject Table B 110.

In the present embodiment, the model allows the query subjects (or tables) and the relationships between them to be organized into subject area groupings called folders. At query time, the transformation or disambiguation enforcement rule is to "choose the relationship that is contained in the folder that is the root of the smallest common sub-tree that contains the two query subjects being joined". This enforcement rule is illustrated in FIG. 3 which shows in outline the same three query subjects Table A 100, Table B 110, Table C 230 as in FIG. 2, and their relationships defined by Join 2 121, Join 3 221, and Join 4 222. In this case, the additional information given is that the Tables A and Table B are part of the same Folder N 340. This extra grouping allows the resolving of many ambiguities transparently and without intervention by the user.

It is crucial that the inverse of this transformation or disambiguation enforcement rule is also enforced: namely that "every relationship is contained by the folder that is the root of the smallest common sub-tree that contains the two query subjects that are its end points". Note that enforcement rules must take account of any changes in folder organisation.

Figure 2:
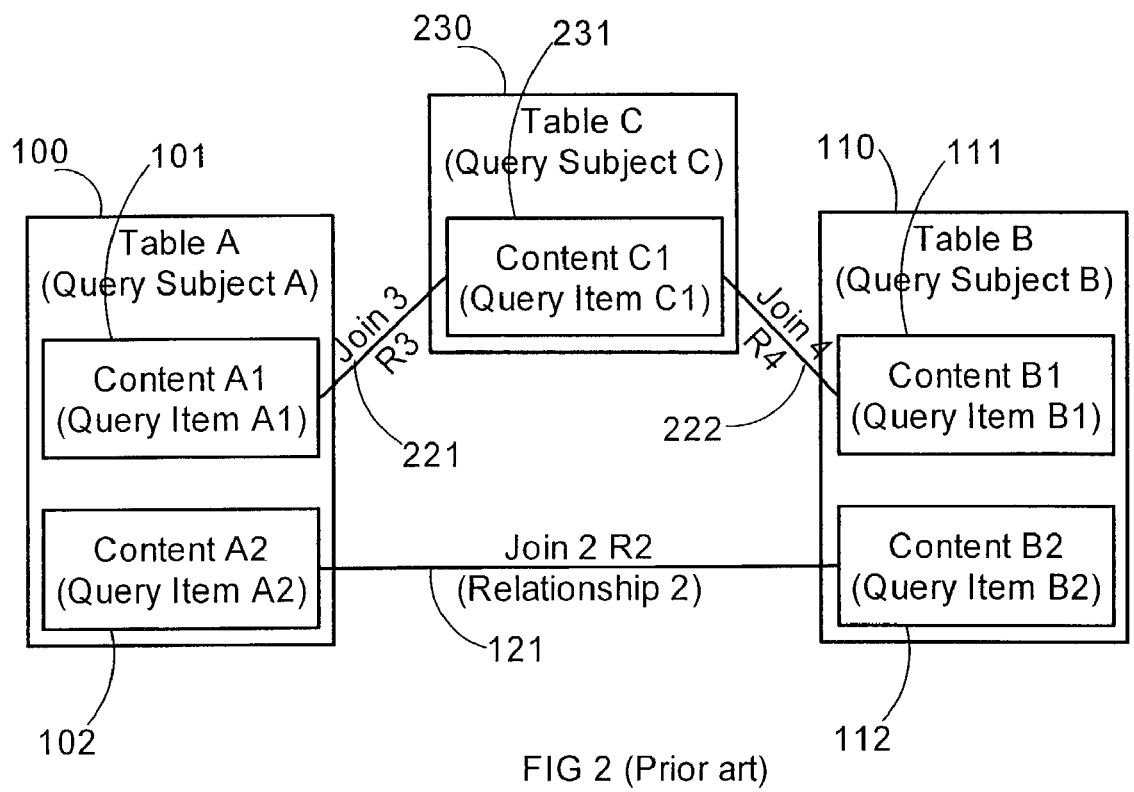
FIG. 2 represents a database consisting of query subjects and relationships, including an intermediate query subject.
Figure 3:
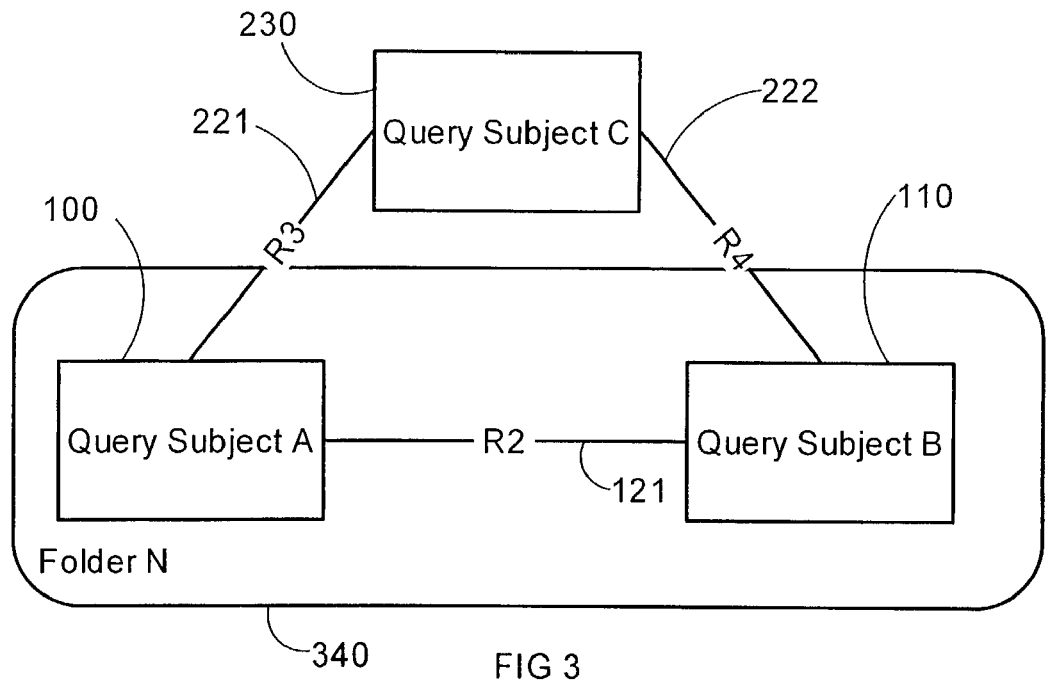
FIG. 3 is used in describing the concept of folders that contain the relationships between objects.
Figure 4:
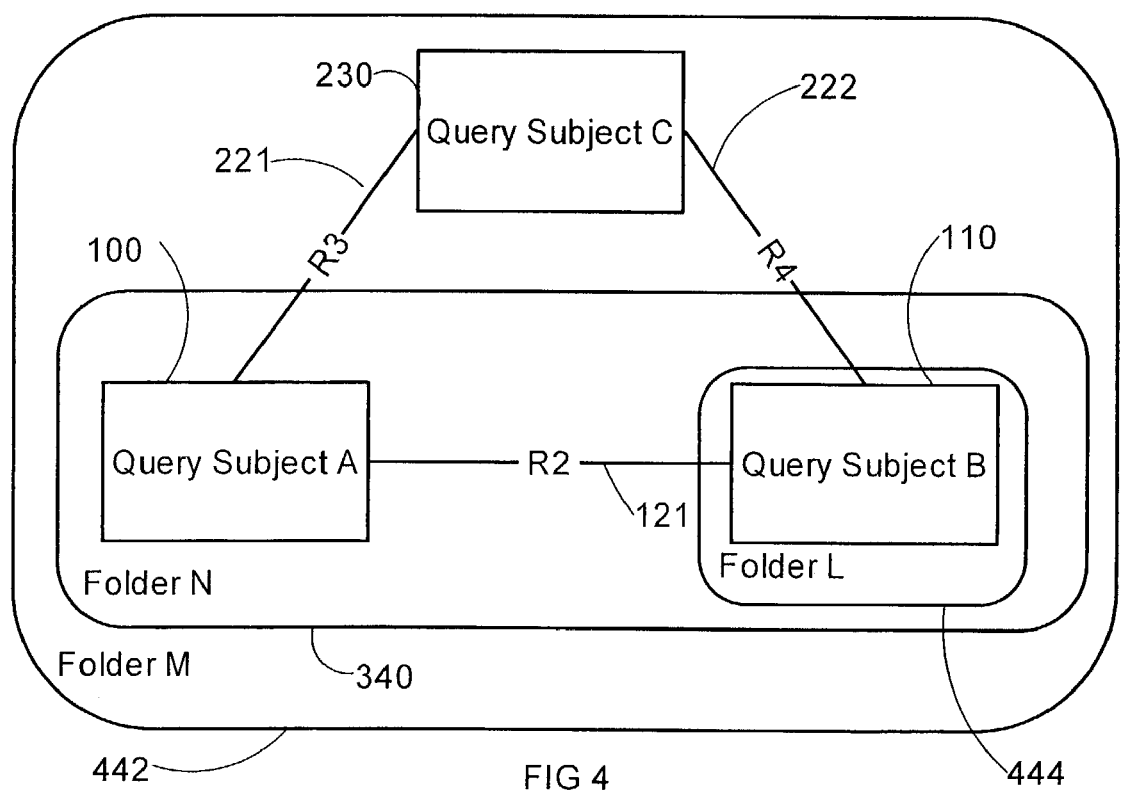
FIG. 4 represents a typical relationship containment rule.

We refer next to FIG. 4, which again shows in outline the same three query subjects Table A 100, Table B 110, Table C 230 as described in relation to FIG. 2, and their relationships Join 2 121, Join 3 221, Join 4 222. The Folder N 340, as described earlier is shown, and in addition two other folders are defined: Folder M 442 which encompasses the three query subjects Table A 100, Table B 110, Table C 230 and their relationships Join 2 121, Join 3 221, Join 4 222, and Folder L 444 which encompasses only query subject Table B 110. The assignment of these folders allows the relationship containment rule to be defined such that the relationship Join 2 121, defined within Folder N 340 is used, not the relationships defined within the additional Folders M 442 or L 444.

To implement the invention as described thus far requires the creation of copies of some of the required query subjects and some of the relationships for each subject area. This is clearly shown in FIG. 5 where 'copy of QSA' 500, 'copy of QSB' 510, and 'copy of QSC' 530 of all the query subjects QSA 100, QSB 110, and QSC 230 are required to be created. As before, there are relationships between the query subjects, or in some cases between query subjects and copies of query subjects: R2 121 between QSA 100 and QSB 110, R3 512 between 'copy of QSA' 500 and QSC 230, and R4 514 between QSC 230 and 'copy of QSB' 510. In addition a 'copy of the (join) relationship R4' 522 is required between 'copy of QSC' 530 and QSB 110.

Figure 6:
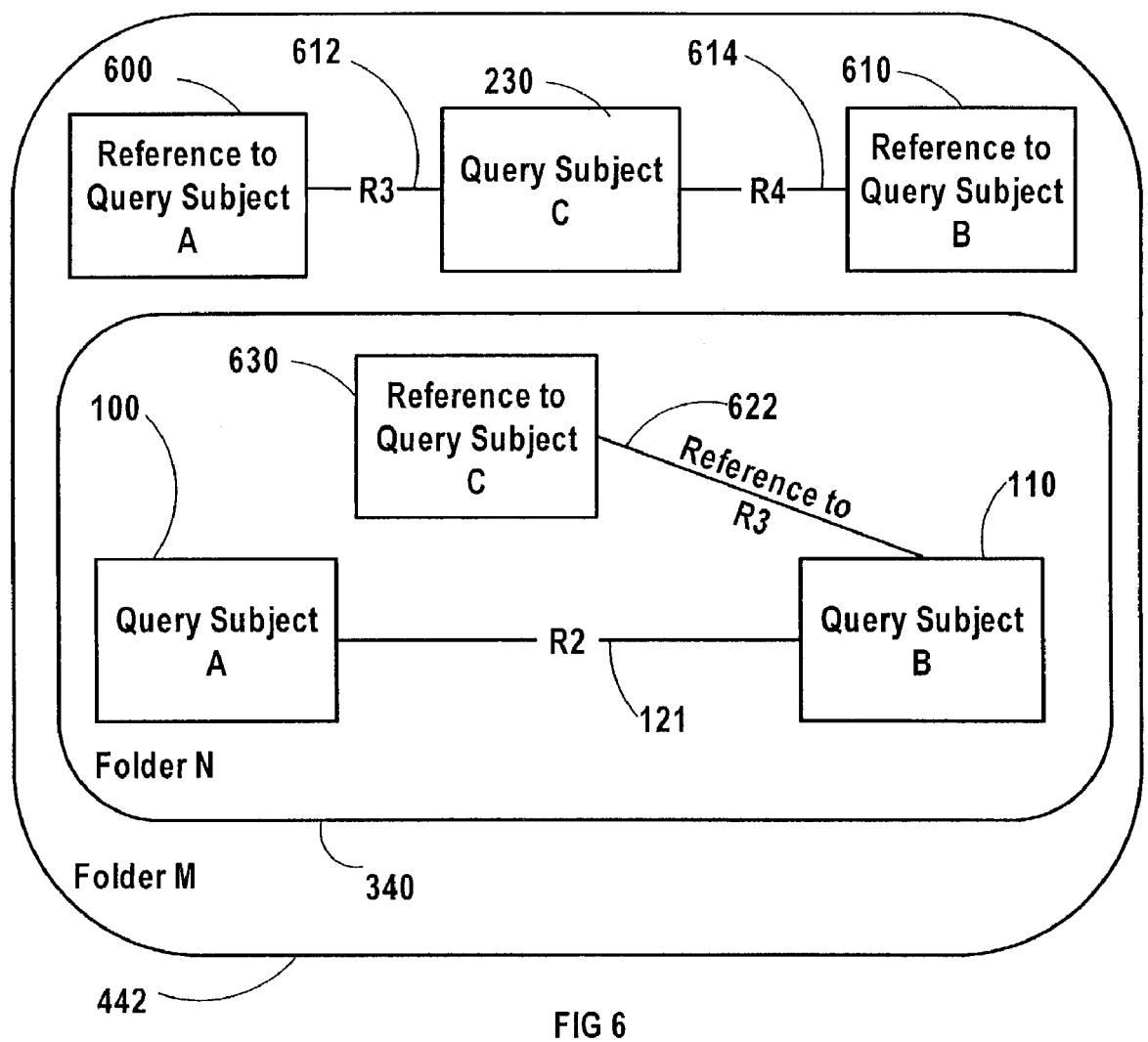
FIG. 6 shows unambiguous relationship alternatives using references to data and references to relationships.
Figure 7:
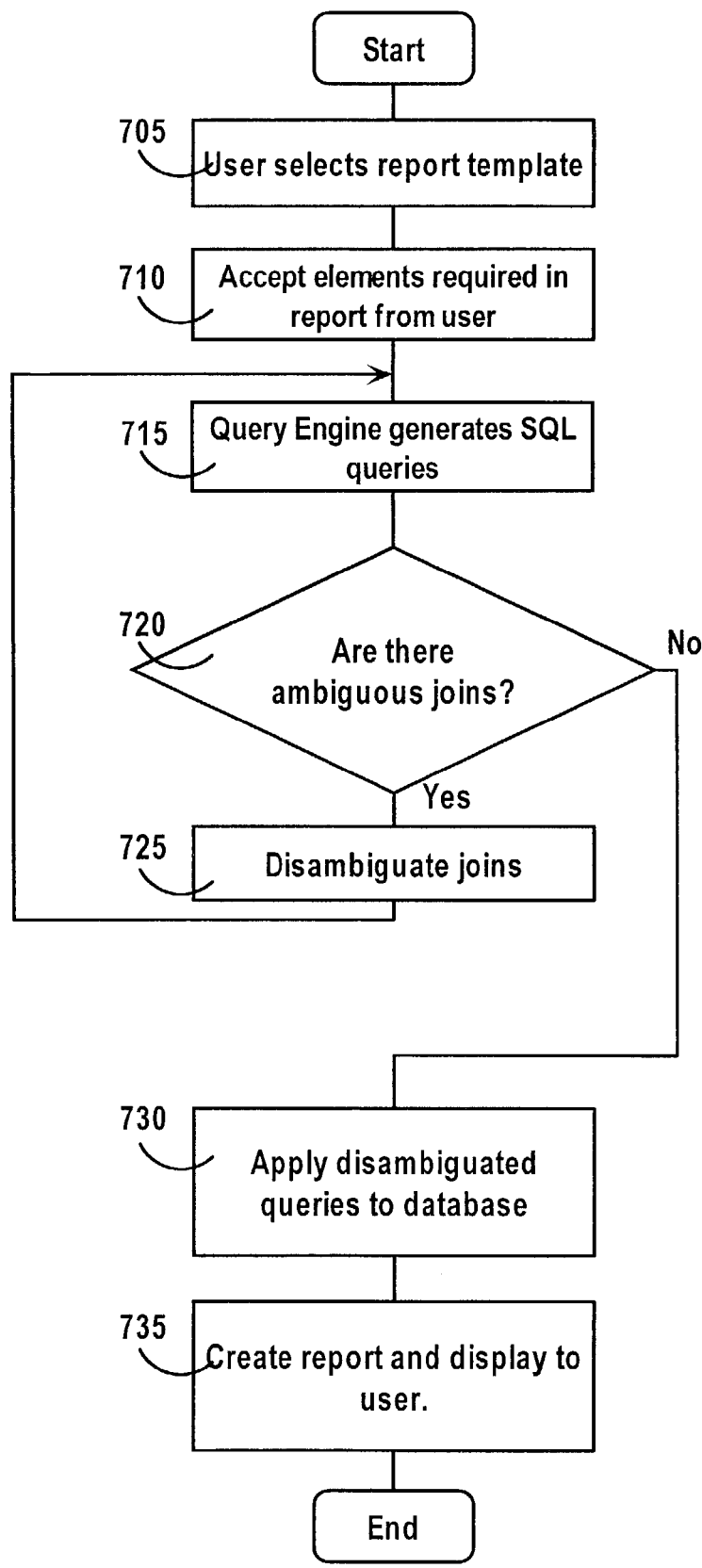
FIG. 7 is a flowchart illustrating operation of the invention.

This embodiment, while solving the join ambiguity problem, creates a maintenance problem in the model, because changes to any of the model elements must be propagated to each of their copies. In general this must be done by manual means In a further preferred embodiment of the invention, to overcome this maintenance problem, copies of the data and relationships used in formulating and defining the relationships are replaced by proxy references, often called shortcuts. To fully attain this goal shortcuts are used not just for query subjects, but also for the relationships themselves. FIG. 6 shows an embodiment of the invention wherein these shortcuts are used in place of copies of the data.

Figure 5:
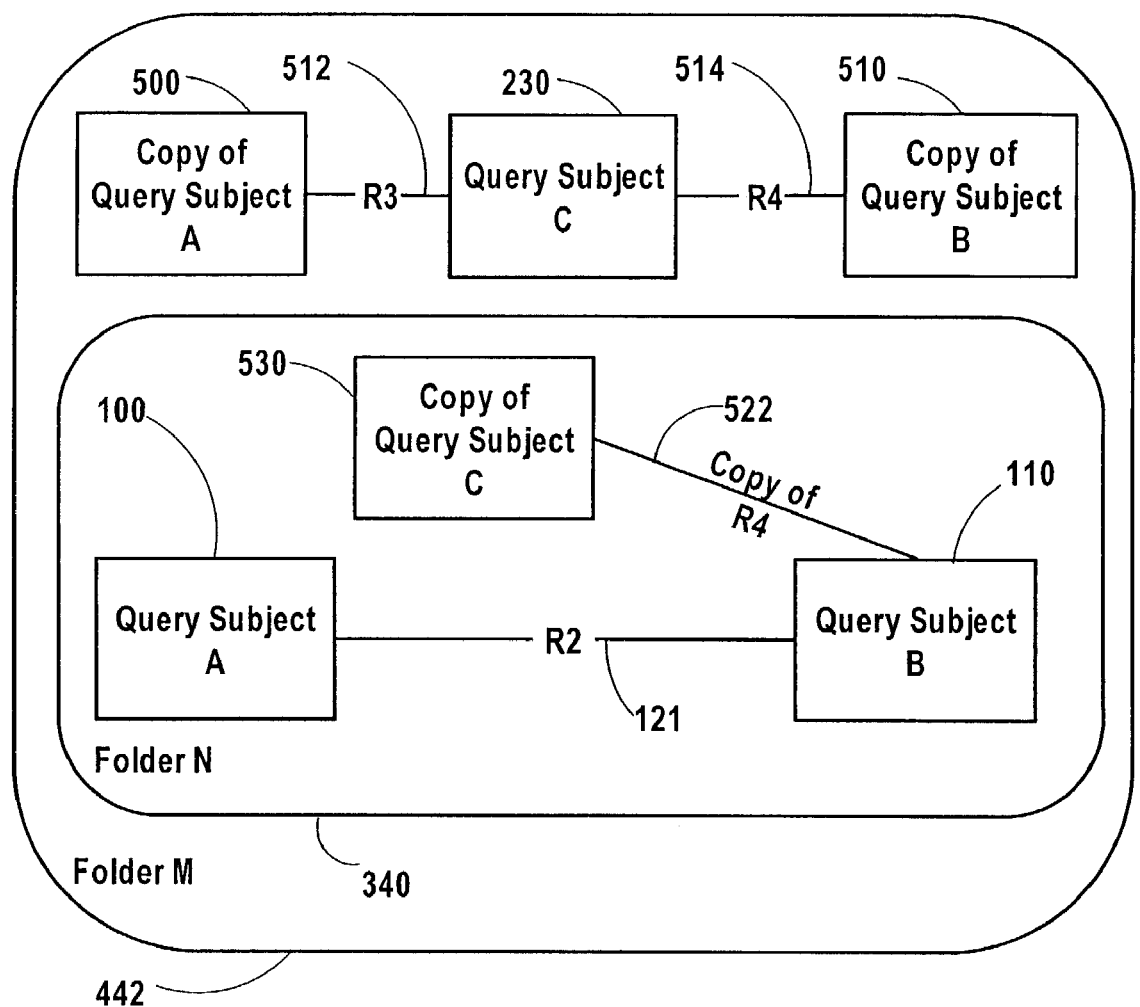
FIG. 5 illustrates unambiguous relationship alternatives using copies of data and copies of relationships.

A direct comparison of FIG. 6 with FIG. 5 shows that where previously copies of QSA, QSB and QSC and R3 were required to be created, this embodiment requires the creation of shortcuts or proxy references. Therefore, the relationships are defined in terms of a 'reference to QSA' 600, a 'reference to QSB' 610, and a 'reference to QSC' 630 as well as to the query subjects QSA 100, QSB 110, and QSC 230. As before, there are relationships between the query subjects, or in some cases between query subjects and references to query subjects: R2 121 between QSA 100 and QSB 110, R3 612 between 'reference to QSA' 600 and QSC 230, and R4 614 between QSC 230 and 'reference to QSB' 610. In addition a 'reference to relationship R3' 622 is required between the 'reference to QSC' 630 and QSB 110. During access, the same actions are performed as before, but this time using the shortcuts or proxy references where appropriate.

The utility of these embodiments is most easily seen in the following simplified description of the custom report operation, as perceived by the user.

Initially, the user selects from a variety of previously defined reports or report templates 705 to be run against tables that are to be joined in the process of producing the report. These report templates are to some extent incomplete, being intended to be somewhat customized by the user, so that not all of the possible elements in the tables or report templates are included in the resulting reports, but rather only those of interest to that user and any related audience. Once the user has performed the necessary selection of elements 710, a reporting tool produces a high level query specifying what model objects are to be included in the report. This high-level query specification is passed to the Query Engine (QE) that then examines it, and the related metadata in the model, and generates the (SQL) query 715 that goes to the underlying database server(s). In addition to constructing the queries required to produce the report, the QE/reporting tool (or both) examines the required relationships, thereby determining any potential ambiguities 720, in the join paths, and performs any disambiguation 725 repeating the query generation and examination for ambiguity as required. Each disambiguation follows the enforcement rules, as previously described with reference to FIG. 3, in that the query engine ensures that the selected relationship is that which is contained in the folder that is the root of the smallest common sub-tree that contains the two query subjects being joined. Once a fully unambiguous set of queries have been assembled, the report is constructed as normal by applying the queries to the database 730, formatting the response, and finally presenting the report 735 to the user, for example on the screen of a personal computer (client) or in printed form.

The invention may be conveniently embodied in an executable or loadable software package, which may be transmitted over data links, or stored on a computer readable medium, for ease of installation on appropriately configured computers.

While the invention is described in conjunction with these preferred embodiments, it will be understood that they are not intended to limit the invention to those embodiments. On the contrary, the invention is intended to cover alternatives, modifications and equivalents, which may be included within the spirit and scope of the invention as defined by the appended claims.

What is claimed is:

1. A computer-implemented method of accessing information in a database, the database having a plurality of query subjects and a plurality of relationship paths between the plurality of query subjects, and creating a report comprising:

organizing the plurality of query subjects and the plurality of relationship paths between the plurality of query subjects into one or more subject area groupings, the one or more subject area groupings being arranged in a hierarchical tree structure;

accepting from a user an indication of elements required in the report to be retrieved from one or more of the plurality of query subjects in the database;

creating a high level query specifying query elements needed to retrieve the elements required in the report;

determining that the high level query includes a plurality of join relationship paths between two query subjects that makes the high level query ambiguous;

identifying a sub-tree of the hierarchical tree structure, the identified sub-tree having a root node comprising a subject area grouping, the subject area grouping including a relationship path joining the two query subjects that are making the high level query ambiguous;

selecting the relationship path of the subject area grouping in the root node of the identified sub-tree;

disambiguating the high level query to create an unambiguous database query joining the two query subjects using the selected relationship path of the subject area grouping in the root node of the identified sub-tree;

querying, using a computer, the database with the unambiguous database query; and creating the report based on a result of the querying the database with the unambiguous database query.

2. The method as claimed in claim 1, wherein organizing the plurality of query subjects and the plurality of relationship paths includes:

identifying query subjects with a plurality of relationship paths;

including a first identified query subject of the identified query subjects in a first subject area grouping;

including a joinable query subject that is joinable to the first identified query subject; and including a relationship path of the plurality of relationship paths joining the first identified joinable query subject to the joinable query subject in the grouping.

3. The method as claimed in claim 2, further comprising:

including the grouping in a further hierarchical grouping;

including a second query subject in the further grouping that is joinable to a query subject included in the grouping; and including a further relationship joining the second query subject to the query subject included in the grouping.

4. The method as claimed in claim 1, further comprising:

creating query subject shortcuts for the query subjects;

creating relationship shortcuts for the relationship paths between the query subjects; and using the query subject shortcuts and relationship shortcuts as the query subjects and the relationship paths.

5. The method as claimed in claim 1, further comprising:

creating query subject copies for the query subjects;

creating relationship copies for the relationship paths between the query subjects; and using the query subject copies and relationship copies as the query subjects and the relationships.

6. The method as claimed in claim 1, wherein the database comprises a plurality of databases.

7. The method as claimed in claim 1, wherein disambiguating the high level query further comprises:

selecting a further relationship to form a collection of relationships, each relationship of the collection of relationships connecting two query subjects, where the collection of relationships is based on the relationships located in the smallest common sub-tree that contain the elements of the query subjects required in the report.

* * * * *